United States Patent
Ge et al.

(10) Patent No.: US 7,953,915 B2
(45) Date of Patent: May 31, 2011

(54) INTERRUPT DISPATCHING METHOD IN MULTI-CORE ENVIRONMENT AND MULTI-CORE PROCESSOR

(75) Inventors: Yi Ge, Beijing (CN); ChaoJun Liu, Beijing (CN); Wen Bo Shen, Beijing (CN); Yuan Ping, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 12/412,286

(22) Filed: Mar. 26, 2009

(65) Prior Publication Data
US 2009/0248934 A1 Oct. 1, 2009

(30) Foreign Application Priority Data

Mar. 26, 2008 (CN) .......................... 2008 1 0084151

(51) Int. Cl.
*G06F 13/24* (2006.01)
(52) U.S. Cl. ........ 710/266; 710/260; 710/261; 710/267; 710/268; 710/269
(58) Field of Classification Search .................... 710/261
See application file for complete search history.

(56) References Cited

U.S. PATENT DOCUMENTS

| | | | |
|---|---|---|---|
| 6,269,390 B1 | 7/2001 | Boland | |
| 7,093,258 B1 | 8/2006 | Miller et al. | |
| 7,117,285 B2 * | 10/2006 | Ota | 710/265 |
| 2003/0110336 A1 * | 6/2003 | Park et al. | 710/260 |
| 2005/0060462 A1 * | 3/2005 | Ota | 710/260 |
| 2005/0228918 A1 * | 10/2005 | Kriegel | 710/260 |
| 2007/0043347 A1 * | 2/2007 | Solomita et al. | 606/33 |
| 2007/0043970 A1 * | 2/2007 | Solomita et al. | 714/10 |
| 2009/0070510 A1 * | 3/2009 | Crossland et al. | 710/266 |
| 2009/0070511 A1 * | 3/2009 | Kaushik et al. | 710/267 |
| 2009/0089470 A1 * | 4/2009 | Ven | 710/260 |
| 2009/0157935 A1 * | 6/2009 | Worthington et al. | 710/264 |
| 2009/0172228 A1 * | 7/2009 | Zimmer et al. | 710/260 |
| 2009/0172229 A1 * | 7/2009 | Zmudzinski | 710/260 |
| 2009/0172423 A1 * | 7/2009 | Song et al. | 713/300 |
| 2009/0177829 A1 * | 7/2009 | Worthington et al. | 710/267 |
| 2009/0198850 A1 * | 8/2009 | Suzuki | 710/267 |
| 2009/0327556 A1 * | 12/2009 | Railing et al. | 710/267 |

OTHER PUBLICATIONS

Annie Foong, et al., An In-Depth Analysis of the Impact of Processor Affinity on Network Performance, Intel R&D, Oregon, USA, pp. 244-250, 2004 IEEE.

* cited by examiner

*Primary Examiner* — Ryan M Stiglic
(74) *Attorney, Agent, or Firm* — The Brevetto Law Group

(57) ABSTRACT

Disclosed is an interrupt dispatching system and method in a multi-core processor environment. The processor includes an interrupt dispatcher and N cores capable of interrupt handling which are divided into a plurality of groups of cores, where N is a positive integer greater than one. The method generates a token in response to an arriving interrupt; determines a group of cores to be preferentially used to handle the interrupt as a hot group in accordance with the interrupt; and sends the token to the hot group, determines sequentially from the first core in the hot group whether an interrupt dispatch termination condition is satisfied, and determines the current core as a response core to be used to handle the interrupt upon determining satisfaction of the interrupt dispatch termination condition. With the invention, delay in responding to an interrupt by the processor is reduced providing optimized performance of the processor.

20 Claims, 3 Drawing Sheets

INTERRUPT DISPATCHING METHOD IN MULTI-CORE ENVIRONMENT AND MULTI-CORE PROCESSOR

FIELD OF THE INVENTION

The present invention generally relates to interrupt handling technologies in the computer field, and in particular to a technology for interrupt handling in a multi-core processor environment.

BACKGROUND OF THE INVENTION

With the rapid development of computer technologies and rapid increase in the speed of network lines, handling TCP/IP packets has been an increasingly complex workload on a computer system. For example, the speed of Ethernet lines tends to reach and even exceed 40 Gb/s, therefore, how to effectively deal with a task of receiving and/or transmitting packets at a high or very high speed has been a pressing problem that needs to be addressed.

There are generally two methods for a network interface card (NIC) to communicate with a processor, i.e., polling and interrupt, but the interruption method is the predominant method for communication. Processing of an interrupt handler actually involves a packet handling method. When the network interface card has packets to be handled by the processor, it delivers packets data into a kernel buffer via Direct Memory Access (DMA), thereby raising an interrupt; the processor switches to a kernel mode in which the processor executes an Interrupt Service Routine (ISR), responds to the interrupt and then returns to a preempted execution point while leaving handling of the packets as a process-level task. Interrupt-driven packet handling can work well in the case of a low frequency of NIC interrupts. However, the processor may suffer from a "livelock" phenomenon upon arrival of a large number of interrupts, which means that the processor can neither be hung up nor process any user program.

Various methods have been proposed for effectively implementing interrupts in a computer system. For example, methods of Interrupt Coalition (primarily applicable to reception of packets, in which several packets are received at a time before an interrupt arises), Hybrid Polling-Interrupt, TCP Offload Engine (TOE), Remote Direct Memory Access (RDMA)/Direct Data Placement (DDP), are several effective solutions proposed in recent years. However, both of the methods of Interrupt Coalition and Hybrid Polling-Interrupt have an undetermined latency, while an aggressive modification to the NIC and kernel is required for the methods of TOE and RDMA, which may not be welcomed by hardware or software developers. Additionally, a TOE-enabled NIC, i.e., TOE NIC, may incur a relatively high cost.

Multi-core processors have been a commonly acknowledged trend of processor designs since the birth of multi-core technologies. Furthermore, the frequency of NIC interrupts has increased with the rapid increase in the speed of network lines. Taking Ethernet as an example, when the line speed is increased to 40 Gb/s, for packets with a maximum size of 1500 bytes, an interruption rate (i.e., the number of interrupts per unit time) is 3200000/s in the case of no Interrupt Coalition, and even in the case of Interrupt Coalition with a coalition factor of 10, the interruption rate is still 320000/s, which may overwhelm a 5 GHz P6 CPU. In a multi-core processor environment, however, each core merely has moderate handling capability and is not powerful enough to handle interrupts at such a high frequency, that is, arriving interrupts have to be dispatched to a plurality of cores for handling. Furthermore, a workload in a core may vary from one core to another in an operating multi-core processor, that is, it may take different times for different cores to handle an interrupt. Control dependency may exist between sequentially arriving packets but with low data dependency therebetween, and those packets transmitted from the NIC are unlikely corrupted packets which need to be retransmitted. Therefore, cache affinity has to be considered for dispatching interrupts (especially NIC interrupts) arriving from the outside to a plurality of cores.

FIG. 1 illustrates a typical multi-core environment. As shown in FIG. 1, a multi-core processor 120 includes an interrupt dispatcher 130 and K cores 140 (denoted respectively by Core 1, Core 2, . . . , Core K) each of which is connected directly with the interrupt dispatcher 130 via a bus. An interrupt signal arriving from the outside, e.g., an I/O interrupt, an NIC interrupt, is sent to the interrupt dispatcher 130 in the multi-core processor 120 via a Programmable Interrupt Controller (PIC) 110, and then the interrupt dispatcher 130 selects or determines one of the K cores 140 as a hot core randomly or according to a predetermined rule (e.g., based upon interrupt priorities and so on.) in accordance with an interrupt identifier (i.e., interrupt ID) and sends the interrupt signal to the hot core for handling.

None of the existing interrupt dispatching methods has considered the issue of workload varying from one core to another or the issue of cache affinity and consequently cannot provide optimized processor performance capable of effective interrupt handling. Therefore, there is a pressing need of an effective interrupt dispatching mechanism in a multi-core environment.

SUMMARY OF THE INVENTION

Summary of the invention will be given below to provide basic understanding of some aspects of the invention. It shall be appreciated that this summary is neither exhaustively descriptive of the invention nor intended to define essential or important parts or the scope of the invention, but is merely for the purpose of presenting some concepts in a simplified form and hereby acts as a preamble of detailed description which will be discussed later.

In order to address at least one of the above problems in the prior art, an object of the invention is to provide an effective interrupt dispatching method in a multi-core processor environment.

Another object of the invention is to provide a multi-core processor which can implement the above interrupt dispatching method and a computer system including the multi-core processor.

In order to attain the above objects, according to an aspect of the invention, there is provided an interrupt dispatching method in a multi-core processor environment, wherein the multi-core processor includes an interrupt dispatcher and N cores capable of interrupt handling, which are divided into a plurality of groups of cores, where N is a positive integer greater than one. The method includes the following steps: a. generating a token in accordance with an interrupt arriving from the outside; b. determining a group of cores to be preferentially used to handle the interrupt as a hot group in accordance with the interrupt; and c. sending the token to the hot group, determining sequentially from the first core in the hot group whether an interrupt dispatch termination condition is satisfied, and determining the current core as a response core to be used to handle the interrupt upon determining satisfaction of the interrupt dispatch termination condition.

According to another aspect of the invention, there is further provided a multi-core processor including N cores capable of interrupt handling, which are divided into a plurality of groups of cores, where N is a positive integer greater than one; and an interrupt dispatcher adapted to generate a token in accordance with an interrupt arriving from the outside, determine a group of cores to be preferentially used to handle the interrupt as a hot group, and send the token to the hot group, wherein it is determined sequentially from the first core in the hot group whether an interrupt dispatch termination condition is satisfied, and the current core is determined as a response core to be used to handle the interrupt upon determining satisfaction of the interrupt dispatch termination condition.

According to still another aspect of the invention, there is further provided a computer system including the above multi-core processor, which is connected with a programmable interrupt controller, wherein grouping of the N cores is implemented by an operating system of the computer.

The invention provides a token-based interrupt dispatching mechanism in a multi-core environment, by means of which a token is generated in accordance with an interrupt arriving from the outside and passed among a limited number of cores for which it is determined sequentially whether the current core is a response core to be used to handle the interrupt. With the interrupt dispatching mechanism according to the invention, delay in responding to the interrupt by the processor can be reduced effectively, thereby providing optimized processor performance.

Another advantage of the invention lies in that, during interrupt dispatching with use of the interrupt dispatching mechanism according to the invention, group IDs of groups of cores to be preferentially used to handle respective interrupts, which are stored in the interrupt dispatcher, can be modified or updated dynamically in accordance with interrupt dispatching histories and the like, so that a group of cores available for responding to the current interrupt can be determined rapidly, thereby improving efficiency of handling the interrupt with use of a locality feature of caches.

Preferred embodiments of the invention will be described in detail below with reference to the accompanying drawings to make these and other advantages thereof more apparent.

BRIEF DESCRIPTION OF THE DRAWINGS

The invention can be better understood with reference to the description given below in conjunction with the accompanying drawings, throughout which identical or like components are denoted by identical or like reference signs, and together with which the following detailed description are incorporated into and form a part of the specification and serve to further illustrate preferred embodiments of the invention and to explain principles and advantages of the invention. In the drawings.

Figure 1:
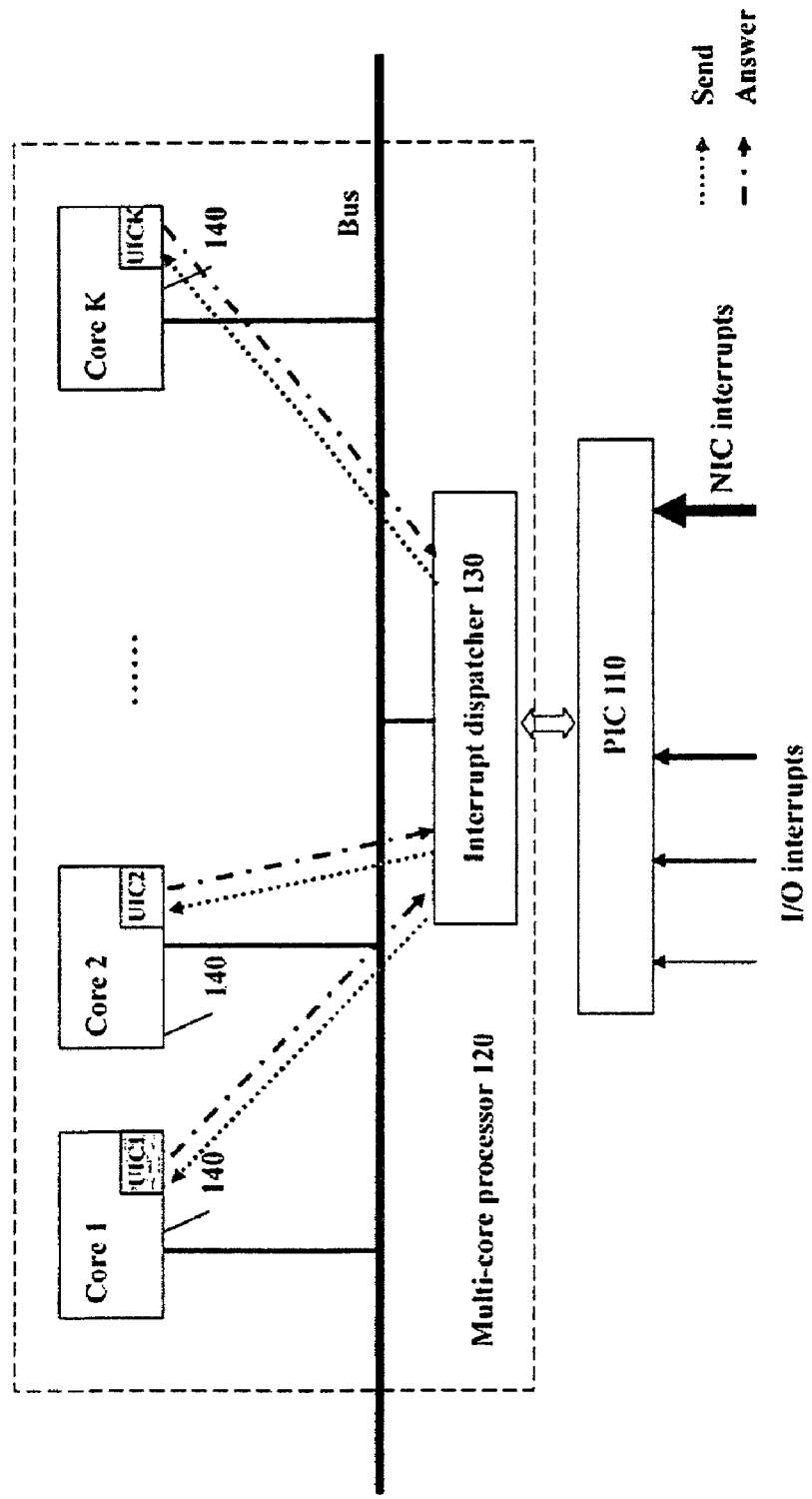
FIG. 1 illustrates a schematic block diagram of a typical multi-core environment.

Those skilled in the art shall appreciate that elements in the drawings are illustrated merely for the purposes of simplicity and clarity and not necessarily drawn to scale. For example, some elements in the drawings may be enlarged in dimension relative to other elements to facilitate improved understanding of the embodiments of the invention.

DETAILED DESCRIPTION OF THE INVENTION

Exemplary embodiments of the invention will be described below with reference to the drawings. Not all of the features of the embodiments will be described in the specification for clarity and conciseness. However, it shall be appreciated that numerous implementation-specific choices must be made during development of such actual implementations to attain specific goals of developers.

It shall further be noted that, only device structures and/or processing steps closely relevant to solutions of the invention are illustrated in the drawings, while other details less relevant to the invention are omitted so as not to obscure the invention with unnecessary details.

Figure 2:
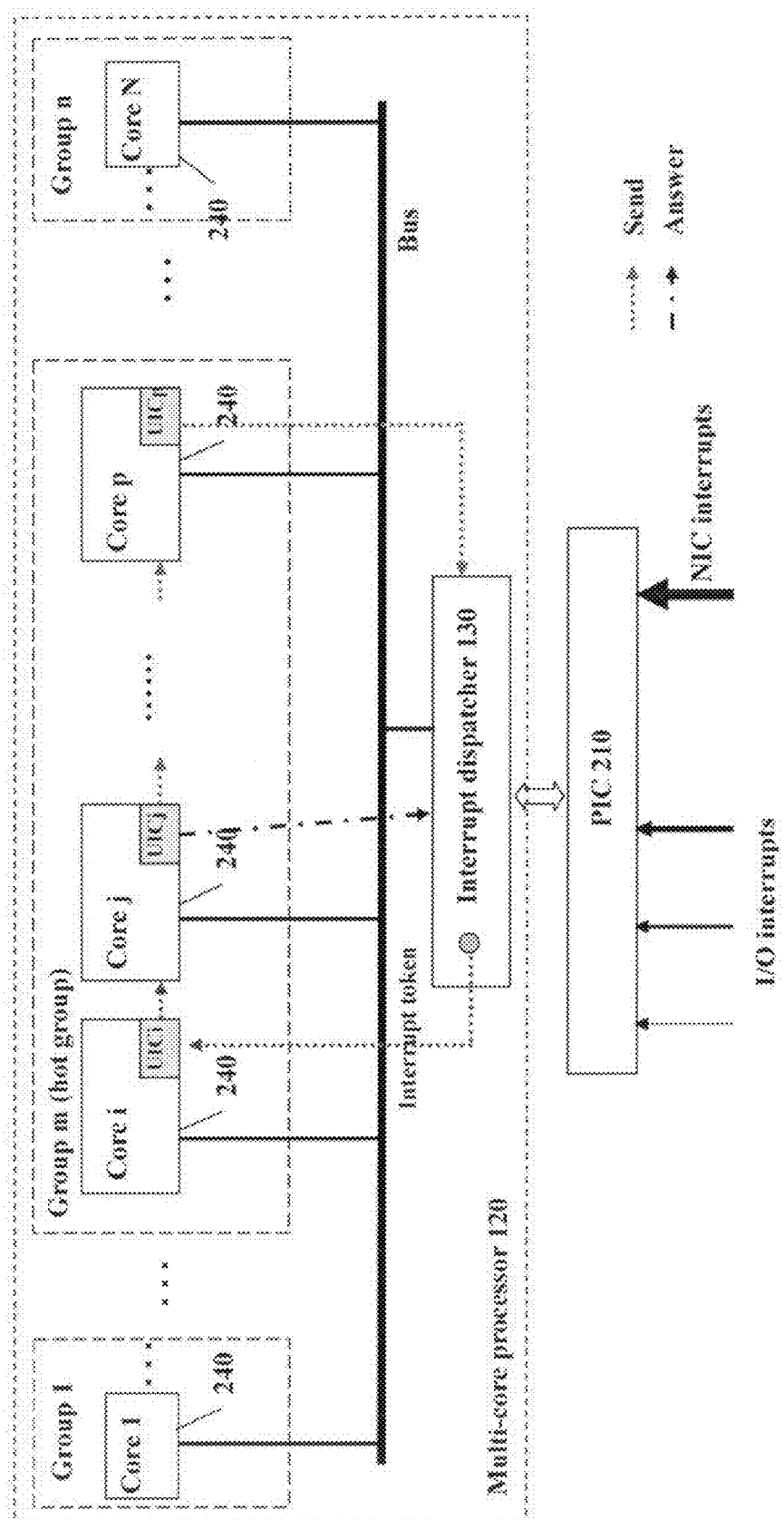
FIG. 2 illustrates a schematic block diagram of a multi-core environment where interruption dispatching can be effectively implemented according to an embodiment of the invention.

FIG. 2 illustrates a schematic block diagram of a multi-core environment where interruption dispatching can be effectively implemented according to an embodiment of the invention. It is assumed here that more than one core, e.g., N cores, instead of all the cores in a multi-core processor 220 are capable of interrupt handling, where N is a positive integer greater than one. Therefore, FIG. 2 illustrates only these processor cores 240 capable of interrupt handling (denoted respectively by Core 1, . . . , Core N) for simplicity and only description of these cores capable of interrupt handling will be involved below for concision.

In the multi-core environment illustrated in FIG. 2, N cores 240 are divided into n groups (i.e., groups of cores) denoted respectively by Group 1, . . . , Group n. Grouping referred to here is a logic grouping process which can be accomplished by, for example, an operating system of a computer, for example, in the following way: there is arranged in a Universal Interrupt Controller (UIC) of each core a next-core-number field, where an identifier (i.e., core ID) of the next core in the same group as this core is stored, or an interrupt dispatcher ID is stored for the last core in each group of cores, and a group ID of each group is set equal to the core ID of the first core in the group. The group IDs of the respective groups of cores resulting from logic grouping can be stored in an interrupt dispatcher 230 herein, however, the invention is not limited to this and those skilled in the art can also store them elsewhere as required.

Those skilled in the art shall appreciate that the above grouping process is merely exemplary, and obviously the cores can be grouped in other ways as required, and that values of the group IDs can be set as other values as long as the first core and further other cores in the group of cores can be determined based on the group ID of each group of cores.

For each interrupt arriving from the outside (including an I/O interrupt, an NIC interrupt, it is handled preferably by a designated group of cores, below referred to as a "preferable group of cores", which is a group of cores to be preferentially used to handle the interrupt, and when none of the cores in the preferable group is available for handling the interrupt, a group of cores is selected arbitrarily from the remaining N-1 groups of cores (i.e., groups of cores other than the preferable group of cores, also referred to as candidate groups of cores). A group of cores for which it is determined whether there is any core in the group available for interrupt handling will be referred to as a "hot group" hereinafter for the convenience of description. To this end, an interrupt dispatch table is stored in advance in the interrupt dispatcher 230, in which at least interrupt IDs of individual interrupts and group IDs of preferable groups of cores to be preferentially used to handle the respective interrupts are stored, so that the interrupt dispatcher 230 can determine a corresponding preferable group of cores as the hot group in accordance with an interrupt ID of an arriving interrupt sent from a programmable interrupt controller (PIC) 210, and select one of candidate groups of cores as the hot group if none of the cores in the preferable group is available.

The interrupt dispatcher 230 generates a token in accordance with an interrupt ID of an interrupt signal from the PIC 210 and passes the token to the hot group. Starting from the first core in the hot group till the last core in the group, it is determined sequentially whether the current core can grasp the token (that is, whether the core is available for handling this arriving interrupt). Here, each core 240 can know its current operation status including, for example, the current workload thereon, that interrupt signal being processed thereon, etc., in any method known in the prior art and accordingly determine whether it is available for handling each arriving interrupt.

Here, the token includes at least the following four fields: (1) an interrupt-number field for storing the interrupt ID of the arriving interrupt; (2) a destination-core-number field for storing a core ID of the next core to which the token is intended to be sent; (3) a TTL field, a value of which indicates lifetime of the token, with a value of zero (i.e., TTL=0) indicating that the token expires; and (4) a response-core-number field for storing a core ID of a core to be used to handle the arriving interrupt.

Figure 3:
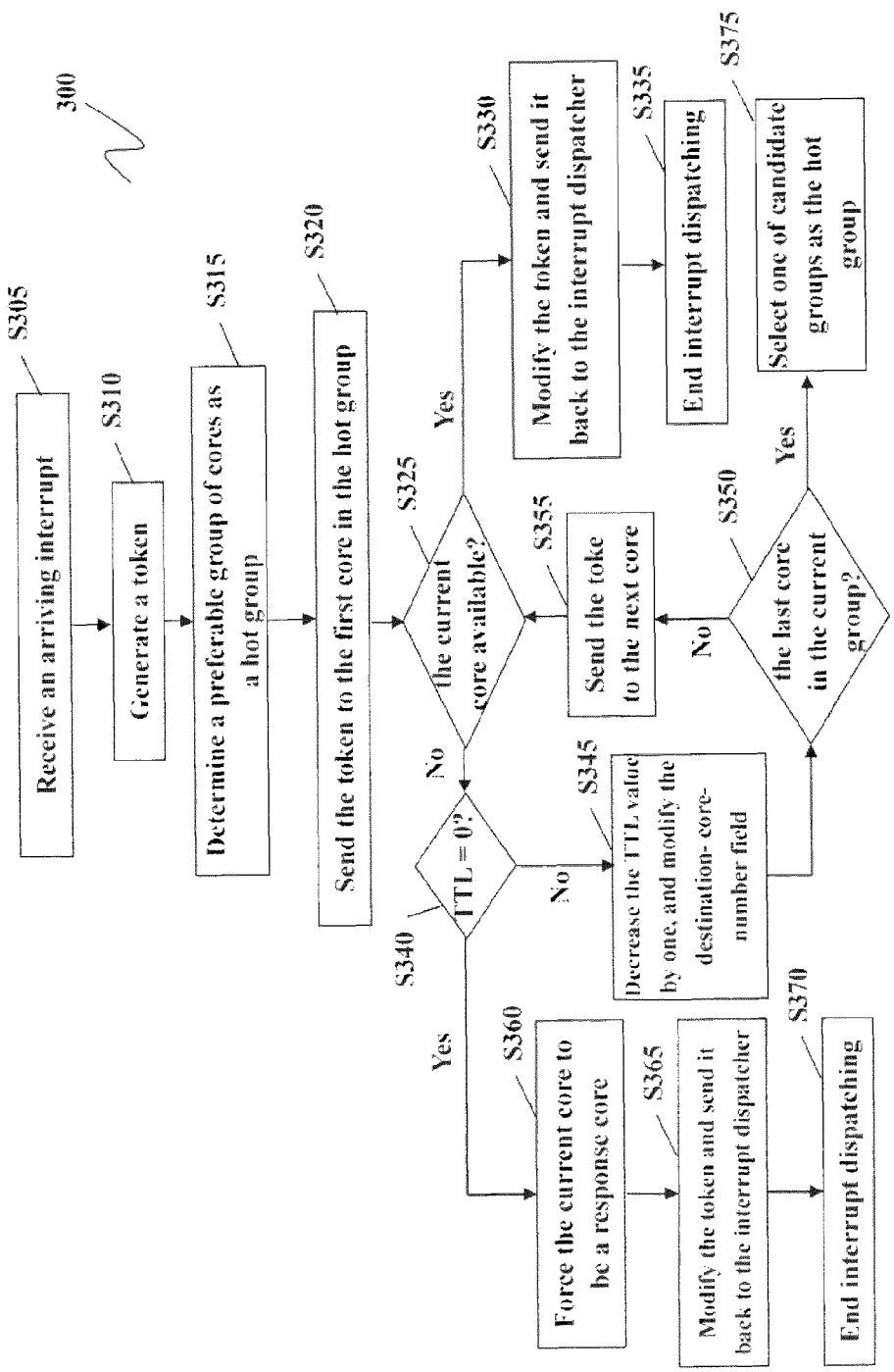
FIG. 3 illustrates a flow chart of an interrupt dispatching method in the multi-core environment illustrated in FIG. 2 according to an embodiment of the invention.

Implementation of interrupt handling in the multi-core environment illustrated in FIG. 2 according to an embodiment of the invention will be described with reference to a flow chart illustrated in FIG. 3. FIG. 3 illustrates a schematic flow chart of an interrupt dispatching process 300 implemented in the multi-core environment as shown in FIG. 2 according to an embodiment of the invention.

As shown in FIG. 3, the interrupt dispatcher 230 receives from the PIC 210 an interrupt signal arriving from the outside at step S305, and at step S310, generates a token, for example, as described above, in accordance with an interrupt ID of the received interrupt signal, that is, by initializing at least the above four fields. For example, when generating the token in accordance with the interrupt ID, the interrupt dispatcher 230 may initialize the destination-core-number field as a core ID of the first core in a hot group corresponding to the interrupt ID (i.e., a preferable group of cores, which can be determined, for example, by referring to the interrupt dispatch table stored in the interrupt dispatcher), initialize the response-core-number field as NULL and initialize the TTL field as a predetermined value (e.g., equal to the number of cores in the hot group). Obviously, the above fields in the token may also be initialized as other values.

At step S315, the interrupt dispatcher 230 determines a corresponding preferable group of cores as the hot group (and hence determines the first core in the group) in accordance with the interrupt ID, for example, by referring to the interrupt dispatch table stored therein. It is assumed here that the hot group is Group m illustrated in FIG. 2, which includes Core i, Core j, . . . , Core p.

Next, the interrupt dispatcher 230 sends the token generated at step S310 to the first core in the hot group (here Core i) at step S320. Then, the current core determines whether it is available for handling the arriving interrupt in accordance with the current workload thereon at step S325. If a determination result of step S325 is Yes, that is, if it is determined that the current core is available for handling the arriving interrupt, then at step S330, the current core modifies the token, i.e., fills the core ID of the current core in the response-core-number field of the token, decreases the value of the TTL field by one and modifies the value of the destination-core-number field as the interrupt dispatcher ID, and then sends the modified token back to the interrupt dispatcher 230. Thereafter the interrupt dispatching process 300 ends at step S335.

If the determination result of step S325 is No, that is, if it is determined that the current core is unavailable, then it tests whether the current TTL value is zero at step S340. If it is determined at step S340 that the current TTL is zero, which indicates that the token expires, then the process goes to step S360, where the current core is forced to act as a response core to be used to handle the interrupt, and then the process goes to step S365. Steps S365 and S370 proceed similar to step S330 and S335, therefore the description thereof is not repeated.

If it is determined at step S340 that TTL≠0, then the TTL value in the token is decreased by one and the value of the destination-core-number field is modified to the value of the next-core-number field in the current core at step S345. Then, at step S350, it is determined whether the current core is the last core in the current group (for example, by comparing the value of the next-core-number field in the current core with the interrupt dispatcher ID, and if they are identical, then the current core may be determined as the last core in the current group). If the current core is not the last core in the group, then the token is sent to the next core in the same group in accordance with the value of the destination-core-number field at step S355. Processing of step S325 to step S370 is repeated until there is any available core in the current group of cores or the TTL value is zero (that is, until determining a response core to be used to handle the interrupt), then the interrupt dispatching process 300 ends.

Those skilled in the art will appreciate that, it is described here as an interrupt dispatch termination condition whether there is any core in the hot group available for handling the interrupt and whether the token expires, but the invention will not be limited thereto.

If the current core is found to be as the last core in the group (at this time, the value of the destination-core-number field in the token has been modified to the interrupt dispatcher ID) at step S350, which indicates that none of the cores in the current group of cores is available for handling the current interrupt, then the interrupt dispatcher 230 selects one of candidate groups of cores as the hot group (at this time, the token has been sent back to the interrupt dispatcher and the interrupt dispatcher modifies the value of the destination-core-number field in the token to the core ID of the first core in the selected candidate group of cores) at step S375, then the process goes back to step S320. Processing of step S325 to step S370 is repeated until there is an available core in the current group of cores or the TTL value is zero,. then the interrupt dispatching process 300 ends.

It shall be noted here that, as described above, a group ID of a preferable group of cores corresponding to a certain interrupt ID is stored in the interrupt dispatcher 230 and the TTL field is initialized with a predetermined value by an operating system dependent upon a practical scenario, but the predetermined value may be above the total number of cores in the group of cores. In this case, in the interrupt dispatching process illustrated in FIG. 3, when it is determined that none of the cores in the preferable group of cores and the currently selected candidate group of cores is available for handling the current interrupt, the interrupt dispatcher 230 may select again any of the remaining candidate groups of cores as the hot group at step S375 and processing of step S325 to step S370 is repeated until there is an available core in the current hot group or the TTL value is zero, and then the interrupt dispatching process ends. However, preferably, the TTL file has an initial value which is set equal to or greater than the total number of cores in the preferable group of cores and lower than or equal to the sum of the total number of cores in the preferable group of cores and an average total number of cores per group of the N−1 candidate groups of cores.

After the interrupt dispatching process ends, the interrupt dispatcher 230 sends the interrupt signal to the corresponding response core for handling in accordance with the value of the response-core-number field in the current token.

As can be seen from FIG. 2, in the interrupt dispatching process 300 illustrated in FIG. 3, for an interrupt arriving from the outside, a token, after being generated, starts off from the interrupt dispatcher 230, passes sequentially the first core, the second core, etc., in the hot group and will not be sent back to the interrupt dispatcher until a response core to be used to handle the interrupt is determined, thereby forming a complete "token ring".

Although the multi-core environment and the interrupt dispatching process according to the invention have been described above with reference to FIG. 2 and FIG. 3, those skilled in the art shall appreciate that the above description is merely exemplary and obviously some components in the multi-core environment and/or some steps in the interrupt dispatching process as described above can be modified in terms of details to accommodate different demands. For example, the order of the processing steps illustrated in FIG. 3 is also merely exemplary and some of the steps can be executed concurrently or even in a reverse order. Additionally, the operating system can also adjust logic grouping of the cores in the multi-core processor in accordance with the current operation status of the respective cores in the processor and/or information on interrupt handling histories for the same type of interrupts, etc., thereby enabling dynamic grouping. At this time, it is sufficient to modify only a core ID of the next core stored in a core in question and when necessary (for example, when the first core in a group of cores is changed), also to modify one or more group IDs stored in the interrupt dispatcher. Furthermore, the operating system can also modify or update group IDs of the preferable groups of cores for preferentially handling respective interrupts stored in the interrupt dispatcher 230 in accordance with the current operation status of the respective cores in the multi-core processor and/or information on interrupt handling histories for the same type of interrupts, etc., so that the interrupt dispatch table can be updated dynamically. Of course, other various modifications are also possible and will not be enumerated here.

It shall further be noted that strategies for core grouping may influence the performance of handling an interrupt of the multi-core processor. For example, if there are s cores in the processor, which are divided into s groups, then in the interrupt dispatching process illustrated in FIG. 3, the interrupt dispatcher 230 may send a generated token directly to a corresponding core (i.e., hot core), thereby increasing efficiency of selecting the hot core but resulting in increased complexity of logic implementation of the processor. On the other hand, the interrupt dispatcher 230 may connect all the cores with "one token ring" in the case of dividing the s cores into one group. That is to say, the token has to traverse all the cores from the first core upon arrival of each interrupt, which may be very time-consuming. Therefore, both complexity and efficiency of the implementation shall be considered when grouping. One relatively simple way is to divide the s cores averagely into several groups, i.e., the number of cores in each group is the same, however, the interrupt dispatching mechanism of the invention is obviously not limited thereto. Furthermore, although the individual groups of cores are shown separate from each other in FIG. 2 and the cores in the group of cores Group m are denoted by reference signs Core i, Core j, etc., this will neither mean that the groups of cores are unrelated to each other nor mean that the cores in the respective groups of cores are numbered sequentially. For example, some of the groups of cores may be nested or partially overlapped with each other.

As apparent from the above description, with the above interrupt dispatching mechanism according to the invention, a token generated based upon an arriving interrupt is passed in a "token ring" of a limited length (that is, in a corresponding preferable group of cores and if necessary, also in a selected candidate group of cores) based upon logic grouping of a plurality of cores, so as to determine a response core to be used to handle the interrupt and send the interrupt to the response core for handling, so that delay in handling the interrupt by the processor can be reduced and interrupt handling can be easy to implement without any modification to syntax and semantics of the interrupt.

Furthermore, when performing interrupt dispatching according to the above described method, the interrupt dispatcher can modify or update dynamically group IDs of groups of cores to be preferentially used to handle respective interrupts, which are stored in the interrupt dispatcher, therefore a group of cores available for responding to the current interrupt may be determined more rapidly, thereby facilitating further improvement of interrupt handling efficiency.

Finally, it is also noted that, in the context, relational terms such as left and right, the first and the second, and the like are used merely to distinguish one entity or action from another without necessarily requiring or implying such an actual relationship or order between these entities or actions. Moreover, the terms "comprise", "comprising", "include" or any other variations thereof, are intended to cover non-exclusive inclusion so that a process, method, article, or device that comprises a list of elements does not only include these elements but also may include other elements not explicitly listed or inherent to such process, method, article, or device. An element preceded by "a" or "an" does not, without more constraints, preclude the existence of additional identical elements in the process, method, article, or device that comprises the element.

Although the embodiments of the invention have been described above with reference to the drawings, it shall be appreciated that the above embodiments are merely illustrative of the invention but are not intended to limit the invention. Those skilled in the art can make various modifications and variations to the embodiments without departing from the spirit and scope of the invention. Accordingly, the scope of the invention shall be merely defined as the appended claims and their equivalents.

What is claimed is:

1. An interrupt dispatching method in a multi-core processor environment, wherein the multi-core processor comprises an interrupt dispatcher and N cores capable of interrupt handling which are divided into a plurality of groups of cores, the method comprising steps of:

generating a token in accordance with an interrupt arriving from the outside;

determining a group of cores to be preferentially used to handle the interrupt as a hot group in accordance with the interrupt;

passing the token to the hot group, determining sequentially from the first core in the hot group whether an interrupt dispatch termination condition is satisfied, and determining the current core as a response core to be used to handle the interrupt upon determining satisfaction of the interrupt dispatch termination condition;

sending a modified token back to the interrupt dispatcher, the modified token indicating the determined response core; and sending the interrupt from the interrupt dispatcher to the response core for handling in response to the interrupt dispatcher receiving the modified token.

2. The method according to claim 1, wherein the interrupt to be handled by the group of cores is an arriving interrupt further comprising:

if the interrupt dispatch termination condition is satisfied for none of the cores in the current hot group, then selecting one of the remaining groups of cores as the hot group in accordance with the interrupt and repeating the passing of the token to the hot group until the response core is determined.

3. The method according to claim 1, wherein the determining whether the interrupt dispatch termination condition is satisfied comprises:

determining whether the current core is available for handling the interrupt and whether the token expires; and determining satisfaction of the interrupt dispatch termination condition if there is any core in the hot group available for handling the interrupt or the token expires.

4. The method according to claim 3, wherein whether the core is available for handling the interrupt is determined in accordance with the current operation status of the core.

5. The method according to claim 1, further comprising:

sending the interrupt to the response core for interrupt handling upon determining the response core.

6. The method according to claim 1, wherein the token comprises at least the following fields:

an interrupt-number field for storing an interrupt ID of the interrupt;

a destination-core-number field for storing a core ID of a core to which the token is intended to be sent;

a TTL field, a value of which indicates lifetime of the token; and a response-core-number field for storing a core ID of the response core to be used to handle the interrupt.

7. The method according to claim 6, wherein interrupt IDs of a plurality of interrupts and group IDs of groups of cores to be preferentially used to handle the respective interrupts are stored in advance in the interrupt dispatcher.

8. The method according to claim 7, wherein:

the group ID of each of the plurality of groups of cores corresponds to the core ID of the first core in the group of cores; and each of the N cores has a next-core-number field stored therein, in which the core ID of the next core in the same group of cores is stored for each of the cores other than the last core in each of the plurality of groups of cores while an interrupt dispatcher ID is stored for the last core in each of the plurality of groups of cores.

9. The method according to claim 8, wherein the N cores are capable of being re-grouped dynamically.

10. The method according to claim 7, wherein the group IDs of the groups of cores to be preferentially used to handle the respective interrupts stored in the interrupt dispatcher are updatable dynamically.

11. A multi-core processor, comprising:

N cores capable of interrupt handling which are divided into a plurality of groups of cores, where N is a positive integer greater than one; and an interrupt dispatcher adapted to generate a token in accordance with an interrupt arriving from the outside, determine a group of cores to be preferentially used to handle the interrupt as a hot group, and send the token to the hot group, wherein it is determined sequentially from the first core in the hot group whether an interrupt dispatch termination condition is satisfied, and the current core is determined as a response core to be used to handle the interrupt upon determining satisfaction of the interrupt dispatch termination condition; and wherein the interrupt dispatcher is configured to receive a modified token back from the hot group indicating the determined response core, the interrupt dispatcher further being configured to send the interrupt to the response core for handling in response to receiving the modified token.

12. The multi-core processor according to claim 11, wherein the interrupt to be handled by the group of cores is an arriving interrupt, and wherein if the interrupt dispatch termination condition is satisfied for none of the cores in the current hot group, then the interrupt dispatcher selects one of the remaining groups of cores as the hot group.

13. The multi-core processor according to claim 11, wherein it is determined that the interrupt dispatch termination condition is satisfied, if there is any core in the hot group available for handling the interrupt or the token expires.

14. The multi-core processor according to claim 13, wherein whether a core is available for handling the interrupt is determined in accordance with the current operation status of the core.

15. The multi-core processor according to claim 11, wherein the token comprises at least the following fields:

an interrupt-number field for storing an interrupt ID of the interrupt;

a destination-core-number field for storing a core ID of a core to which the token is intended to be sent;

a TTL field, a value of which indicates lifetime of the token; and a response-core-number field for storing a core ID of the response core to be used to handle the interrupt.

16. The multi-core processor according to claim 15, wherein interrupt IDs of a plurality of interrupts and group IDs of groups of cores to be preferentially used to handle the respective interrupts are stored in advance in the interrupt dispatcher.

17. The multi-core processor according to claim 16, wherein:

the group ID of each of the plurality of groups of cores corresponds to the core ID of the first core in the group of cores; and each of the N cores has a next-core-number field stored therein, in which the core ID of the next core in the same group of cores is stored for each of the cores other than the last core in each of the plurality of groups of cores while an interrupt dispatcher ID is stored for the last core in each of the plurality of groups of cores.

18. The multi-core processor according to claim 17, wherein the N cores are capable of being re-grouped dynamically.

19. The multi-core processor according to claim 16, wherein the group IDs of the groups of cores to be preferentially used to handle the respective interrupts stored in the interrupt dispatcher are updatable dynamically.

20. A computer program product stored on a computer readable medium, said computer program product comprising:

logic means for generating a token in accordance with an interrupt arriving from the outside;

logic means for determining a group of cores to be preferentially used to handle the interrupt as a hot group in accordance with the interrupt;

logic means for passing the token to the hot group, determining sequentially from the first core in the hot group whether an interrupt dispatch termination condition is satisfied, and determining the current core as a response core to be used to handle the interrupt upon determining satisfaction of the interrupt dispatch termination condition;

logic means for sending a modified token back to the interrupt dispatcher, the modified token indicating the determined response core; and logic means for sending the interrupt from the interrupt dispatcher to the response core for handling in response to the interrupt dispatcher receiving the modified token.

* * * * *